United States Patent
Lee et al.

(10) Patent No.: US 7,188,763 B2
(45) Date of Patent: Mar. 13, 2007

(54) METHOD AND SERVER OF PROVIDING LOTTO USING BILL AND RECEIPT OF CREDIT CARD OR DEBIT CARD

(76) Inventors: Elim Kyoung Lee, 2440 Highbrooke Trail, Duluth, GA (US) 30097; Suk-jun Chung, 647-23, Yeonsan - Dong, Yeonje-Gu, Busan 611-080 (KR)

( * ) Notice: Subject to any disclaimer, the term of this patent is extended or adjusted under 35 U.S.C. 154(b) by 262 days.

(21) Appl. No.: 11/043,211

(22) Filed: Jan. 26, 2005

(65) Prior Publication Data
US 2006/0163346 A1 Jul. 27, 2006

(51) Int. Cl.
*G06K 5/00* (2006.01)
(52) U.S. Cl. .................. 235/380; 235/379; 705/14; 705/39
(58) Field of Classification Search ........... 235/379, 235/380; 705/14, 34, 39
See application file for complete search history.

(56) References Cited

U.S. PATENT DOCUMENTS

| | | | | |
|---|---|---|---|---|
| 5,513,102 A | * | 4/1996 | Auriemma | 705/14 |
| 2001/0039511 A1 | * | 11/2001 | Duckworth et al. | 705/14 |
| 2005/0021457 A1 | * | 1/2005 | Johnson et al. | 705/39 |
| 2005/0149393 A1 | * | 7/2005 | Leof | 705/14 |

* cited by examiner

*Primary Examiner*—Daniel A. Hess
(74) *Attorney, Agent, or Firm*—Tuchman & Park LLC

(57) ABSTRACT

Disclosed herein is a method and a lotto supply server of providing lotto using a bill or a receipt of a credit or debit card, and utilizing the front and the back side of a receipt or a lotto as an advertising space, in which, a financial VAN company accumulates and manages the paid back money for financial resources to purchase lotto, and a real lotto number printed on a bill or a receipt is provided to a user, thereby increasing sales of a member store due to customers who use credit or debit cards.

4 Claims, 4 Drawing Sheets

Sale :

Transaction #                 2
Card Type :                  VISA
Acc :            **********1234
Entry :                Swiped
Total :                   1.00

Reference No. :     720000123
Auth.Code :           123423
Response : APPROVAL   123412
Sequence Number :       0002

| LOTTO | Draw round | Allotment ratio | LOTTO Number | | | | | |
|---|---|---|---|---|---|---|---|---|
| | 18th | | | | | | | |
| Drawing date | 12/24/04 | | | | | | | |
| Unique number | 123456789 | | | | | | | |
| Code | 987654322 | | | | | | | |

BUSAN HOME SHOPPING
www.busanhomeshopping.com
Tel: 123-456-7890

202
203
201
204

METHOD AND SERVER OF PROVIDING LOTTO USING BILL AND RECEIPT OF CREDIT CARD OR DEBIT CARD

FIELD OF THE INVENTION

The present invention relates to a method and a lotto supply server of providing a lotto using a bill and a receipt of a credit or debit card. More particularly, the invention relates to a method of issuing a lotto using a bill or a receipt of a credit or debit card, and providing the front and the back side of a receipt or a lotto as an advertising space, a marketing means to compensate consumers, to attract customers to member stores, and to increase sales taking advantage of financial VAN (Value Added Network) companies, in which, based on online systems of lotto companies, card companies, and financial VAN companies, lotteries—such as 6/49, 6/51, megaMillios 5/52+mb1/52, Power Ball 5/53+pb1/42, Euro Lottery, and domestic unification lotto—are purchased from all over the world and managed as accumulating mileages; a lotto is issued on the third of three bills of a credit or debit card, or on a separate paper; an advertisement is put on the front or the back of a receipt or a lotto; a lottery is purchased through the Internet; and a bill or a receipt on which a real lotto number printed is provided to a user.

BACKGROUND OF THE RELATED ART

In general, the business of a financial VAN company makes use of a card system of a VAN, which allows a card holder (consumer) a credit transaction through a terminal installed at a member store, ensures a consistent sales for member stores, and collects commissions (a VAN charge, a data communication expense, and an advertisement rate) incurred by the operation of the facilities from member stores.

That is, a financial VAN company collects settlement information and settles up between terminals (inquiry machine) installed at a member store and a credit or debit card company (the company which buys sales bills). At present, settlement information is transferred through VAN when purchase and use a credit or debit card. Also, a financial VAN company plays the role of settling a credit or debit card bill.

A credit or debit card, a means to pay for daily necessaries and consumptions without using cash, which was developed in the USA, had been evolved from a travelers' bill of credit to a travelers' check around 1900, and to a credit card (or a credit coin) which was spread widely until the latter of the 1920's. However, because of the economic depression from the Great Depression in 1929 to the World War II and restriction of consumer finance, the use of a credit card is strictly confined to bring stagnation. In using cards, the operating funds of a VAN company, a paygate company, and a credit or debit card company are raised fundamentally by installment interests of consumers or commissions from member stores, so that small settlement brings difficulties in providing services and disadvantage of low economical efficiency.

Referring to FIG. 1, a method of approving a transaction of a credit or debit card in accordance with conventional methods is briefly explained below.

A user 1 is a credit or debit card holder possessing a credit or debit card issued by a credit or debit card company 4, and a member store 2 has a connection only with a specific financial company 3 and is equipped with a normal CAT which sends settlement information. A CAT 2a and a relay system 3a of a financial VAN company are connected by a telephone network, and a relay system 3a and a transaction approval system 4a of a credit or debit card company are connected by a leased packet network.

A user 1 requests a purchase presenting a credit or debit card to pay for goods or services to a member store 2.

The member store 2 uses a CAT 2a to request approval to a credit or debit card company 4. The CAT 2a integrates user information recorded in the card, purchase information generated by the CAT 2a, and member store information, composing a transaction request message, and connects to a relay system 3a of a financial VAN company 3.

In this case, the transaction request message (user information, purchase information, and member store information) generated by the CAT 2a of the member store 2 is sent to the relay system 3a of the financial VAN company 3.

In order to approve the request, the relay system 3a of the financial VAN company 3, which receives the transaction request message, reads the information of the card company 4 from the transaction request message and sends a combination of the information related to the transaction request to a transaction approval system 4a of a card company.

The transaction approval system 4a of the card company 4 receives and stores the transaction request message, compares user information, purchase information, and member store information with the member information and the member store information of its own. If the user 1 and the member store 2 are qualified as business partners, the transaction between the two is verified.

The transaction approval system 4a of the card company 4 sends an approval message, i.e. a result of the transaction request, to the relay system 3a of the financial VAN company 3, which relayed the approval request, through a packet network.

The relay system 3a of a financial VAN company 3 stores the approval data and forwards it to the CAT 2a of the member store 2. The CAT 2a prints the result of payment on the bill and the receipt of a credit or debit card informing the user of the result based on the returned approval data (details on the result of the approval).

The member store 2 encourages the user 1 to use a credit or debit card, or utilizes advertisement marketing means of a cashback, points, and mileage to attract customers to the member store to increase sales.

Typically, as a means for marketing to attract customers to member stores, a portion of payment is accumulated as cash, mileage, or points and paid back to customers 1.

However, as described above, from the standpoint of a customer, in order to attain to a certain amount of money to satisfy the customer by accumulating a portion of money purchased, a lot of time and economic consumption are required. For a member store, since it pays for a commission as a member store, an outstanding marketing means to attract customers is required to overcome the member store commission.

That is, a way of customer compensation to satisfy both customers and member stores is acutely required in conventional methods of approving a transaction of a credit or debit card.

However, a receipt in a conventional technique has the disadvantages in that it is only a lottery printed on a receipt which cannot be used as a marketing means to attract customers to member stores, or a VAN market may not be used as a competitive means since a VAN company is a large company in a group or a small and medium sized company.

Korean Patent Application No. 2001-3937 discloses another method of issuing a receipt lottery. The patent application comprises steps of registering and administrating detailed information of a member store such as business registration number, store's name, and address; registering and administrating personal information of a customer; storing and administrating predetermined information printed on a receipt, a customer receives when they pay, which is issued by a member store, as a certified lottery number; and drawing the stored and administered certified lottery numbers, and giving cash or a prize to a customer.

The conventional method of issuing a receipt lottery uses only a business registration number of a member store, or an approval number of a credit or debit card used at a member store. It does not differentiate a financial VAN company, or does not present any customer compensation means or method which provides a big prize to a credit or debit card or cash user, or a member store, though a small amount of money is paid.

SUMMARY OF THE INVENTION

Therefore, the present invention has been made in view of the above problems, and it is an object of the present invention to provide a method and a lotto supply server of providing lotto using a bill or a receipt of a credit or debit card, and utilizing the front and the back side of a receipt or a lotto as an advertising space, in which, a financial VAN company accumulates and manages the paid back money for financial resources to purchase lotto, and a real lotto number printed on a bill or a receipt is provided to a user, thereby increasing sales of a member store due to customers who use credit or debit cards.

Another object of the invention is to provide a method of issuing a lotto using a bill or a receipt of a credit or debit card, and providing the front and the back side of a receipt or a lotto as an advertising space, a marketing means to compensate consumers, to attract customers to member stores, and to increase sales taking advantage of financial VAN companies, in which, based on online systems of lotto companies, card companies, and financial VAN companies, lotteries—such as 6/49, 6/51, megaMillios 5/52+mb1/52, Power Ball 5/53+pb1/42, Euro Lottery, and domestic unification lotto—are purchased from all over the world and managed as accumulating mileages; a lotto is issued on the third of the three bills of a credit or debit card, or on a separate paper; an advertisement is put on the front or the back of a receipt or a lotto; the lottery is purchased through the Internet; and a bill or a receipt on which a real lotto number printed is provided to a user.

In order to accomplish the above objects, according to one aspect of the invention, there is provided a method of providing lotto to using a bill or a receipt of a credit or debit card, in which a CAT sends a transaction request message prepared from a combination of user information, purchase information, and member store information to a relay system of a financial VAN company; the relay system of the financial VAN company sends the transaction request message to a transaction approval system of a corresponding financial company; and the transaction approval system of the financial company compares the transaction request message with data of the financial company, verifies the validity of the transaction, and sends a transaction approval message to the relay system of the financial VAN company, the method including the steps of: a) allowing the relay system of the financial VAN company to store a transaction approval data in a transaction approval data DB; b) allowing a lottery number generation module of a lotto to supply server of the financial VAN company to extract a copy multiple, a draw round, and copied lotto to numbers from a lottery management DB; c) allowing a data integration module of the lotto to supply server to integrate the copy multiple, the draw round, and the copied lotto to numbers with the member store approval data; d) allowing the relay system of the financial VAN company to return an integrated approval data of the lotto to the CAT of the member store; and e) allowing by the CAT to output the returned lotto to integrated approval data on the bill or the receipt of the credit or debit card.

In one embodiment, a lottery number copy module of the lotto supply server extracts original lotto to numbers individually from an original lotto to number DB, thereafter copies a lotto number as many as a predetermined copy multiple so as to have a same number or as many as the number of a copy multiple type, and stores the copied lotto number data in a lottery management DB.

According to anther aspect of the invention, there is provided a lotto to supply server connected with at least one CAT, at least one transaction approval system of a financial company, and a lottery selling system through a network, wherein the lotto to supply server includes a processor connected with a memory in which a program is stored for executing the program, the processor, by means of the program, receiving predetermined number of original lotto to numbers in the form of data from a lottery selling system to store the received original lotto to numbers in a lotto to number DB according to its draw round, copying the original lotto to numbers extracted from the lotto number DB as many as the predetermined copy multiple to store the copied original loot numbers in the lottery management DB, and integrating at least one of copy multiples, a draw round, and copied lotto numbers extracted from a lottery management DB with a member store approval data to create an integrated approval data of the lotto, and wherein a relay system of the financial VAN company sends the integrated approval data of the lotto to a corresponding CAT of a member store.

In one embodiment, The lotto to supply server of the invention may further include a lotto to purchase module, a lotto to copy module, a customer refund vs. lotto management module, a lottery number generation module, a data integration module, and a settlement management module; and further include a lotto number DB including at least one original lotto number data, a lottery management DB including at least one copied lotto number data, a member store DB, a consumer compensation money DB, a settlement DB, a transmission result DB, and a card holder DB, which are arranged, modified, extracted, recorded, and stored by a database management system.

The front or the back of a receipt or a lotto may be used as an advertising space of member stores, financial VAN companies and the like, enabling insertion of an advertisement at a cheap price.

BRIEF DESCRIPTION OF DRAWINGS

The above and other objects, features and advantages of the present invention will be apparent from the following detailed description of the preferred embodiments of the invention in conjunction with the accompanying drawings, in which:

FIG. 4 is a plan view illustrating a receipt with printed lotto information according to the method of providing lotto in one embodiment of the invention.

DETAILED DESCRIPTION OF PREFERRED EMBODIMENTS

Reference will now made in detail to the preferred embodiment of the present invention with reference to the attached drawings.

Figure 1:
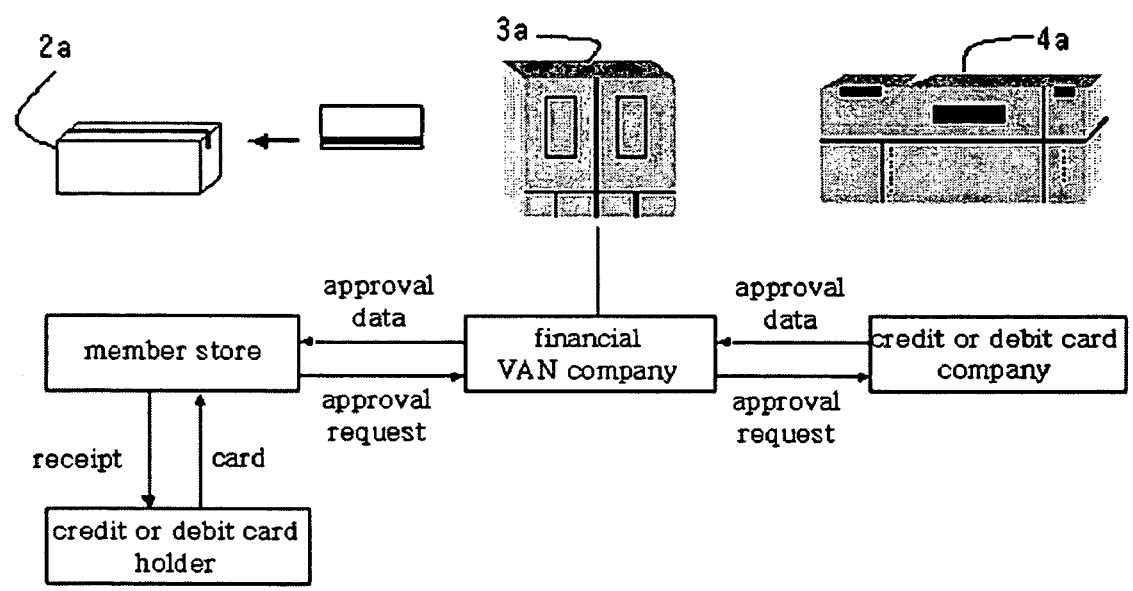
FIG. 1 is a block diagram illustrating a method of approving a transaction of a credit or debit card according to conventional techniques.
Figure 2:
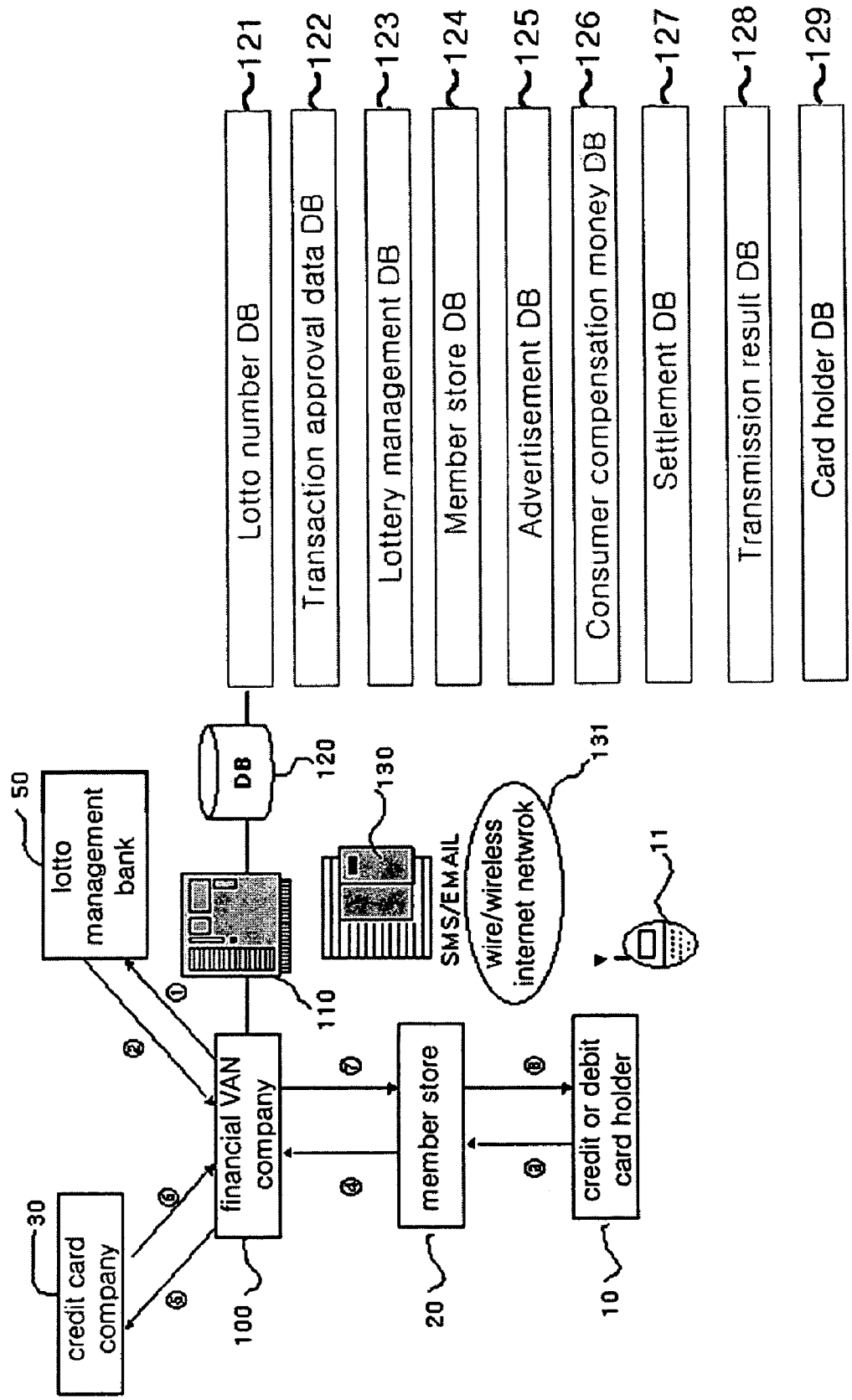
FIG. 2 is a network configuration illustrating a method of providing lotto using a bill or a receipt of a credit or debit card, and providing an advertisement on the front and the back side of a receipt or a lotto according to one embodiment of the invention.
Figure 3:
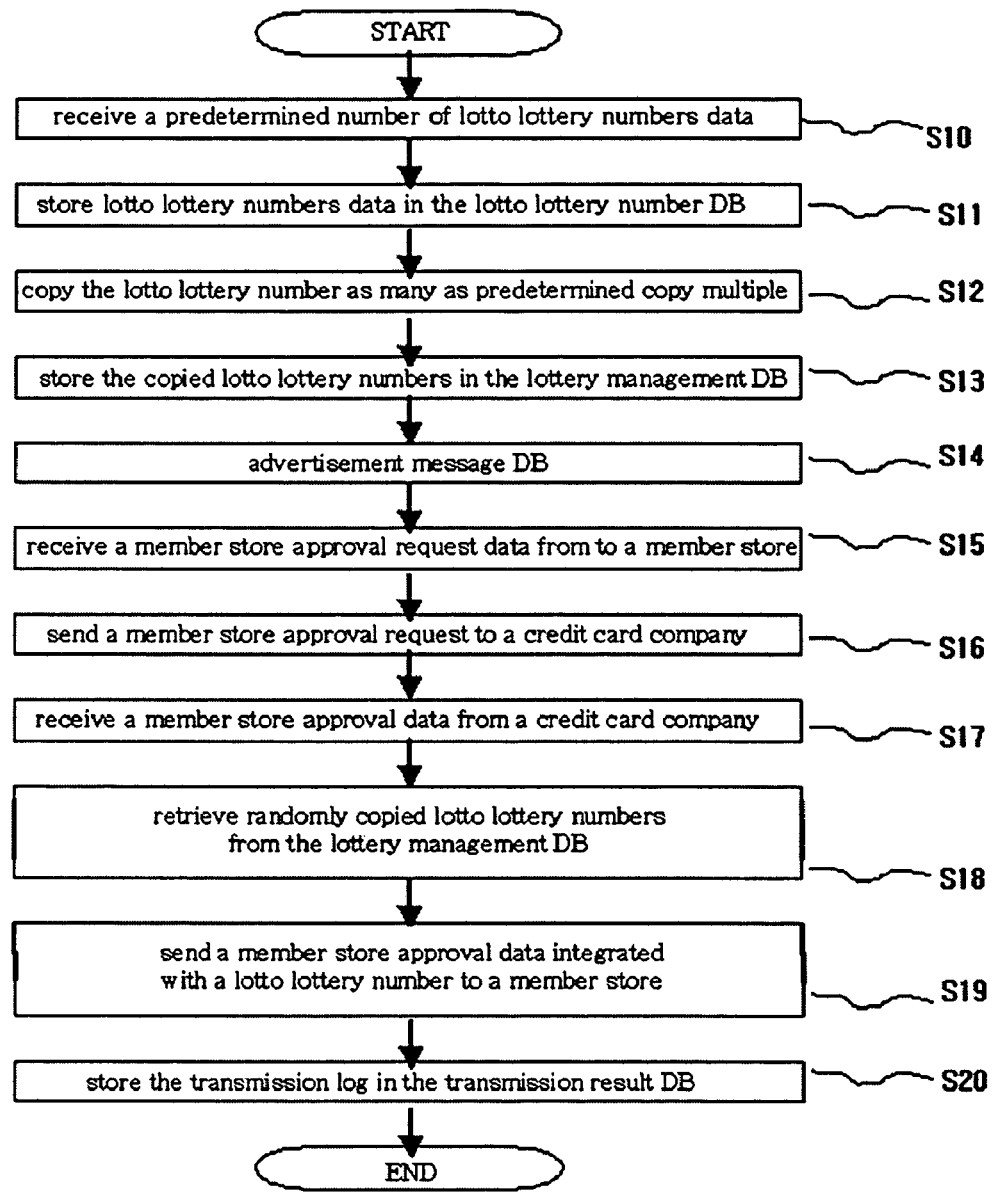
FIG. 3 is a flowchart illustrating a method of providing lotto using a bill or a receipt of a credit or debit card, and providing an advertisement on the front and the back side of a receipt or a lotto by a financial VAN company shown in FIG. 2.

FIG. 2 is a network configuration illustrating a method of providing lotto using a bill or a receipt of a credit or debit card, and providing an advertisement on the front and the back side of a receipt or a lotto according to one embodiment of the invention. FIG. 3 is a flowchart illustrating a method of providing lotto using a bill or a receipt of a credit or debit card, and providing an advertisement on the front and the back side of a receipt or a lotto by a financial VAN company shown in FIG. 2. FIG. 4 is a plan view illustrating a receipt with printed lotto information according to the method of providing lotto in one embodiment of the invention.

As depicted in FIG. 2, a method of providing lotto using a bill or a receipt of a credit or debit card can use an existing credit or debit card infrastructure minimizing the cost for constructing additional systems, enables a financial VAN company 100, to which the invention is applied, to provide a customer compensation service to possess a competitive power, induces a credit or debit card holder 10 to pay in cash, and provides a member store 20 with an advertisement marketing means to attract customers.

The network and system configuration implementing the invention, in connection with conventional techniques, is described below.

A user is a credit or debit card holder 10 possessing a credit or debit card (a financing card) issued by a financing company, or a credit or debit card company 30. A member store 20 installs a CAT which is connected to a financial VAN company 100, which relates to the invention, and transmits information.

The financial VAN company 100 has a relay system connected with CAT's by a telephone network, along with a lotto supply server 110 integrated with the relay system. The relay system is connected to at least one transaction approval system of a credit or debit card company 30 through a leased packet network, and a lotto supply server 110 is also connected to a lottery selling system of a lotto store 40 by a leased packet network. The lottery selling system of the lotto store 40 is connected to a lotto management system of a lotto management bank 50 by a leased packet network.

The lotto supply server 110 of the financial VAN company 100 comprises a lotto purchase module, a lotto copy module, a customer refund vs. lotto management module, a lottery number generation module, a data integration module, and a settlement management module.

Each module is stored in a memory as a type of a program, integrated with the relay system by a processor executing a stored program in connection with the memory. The portion that is integrated with the relay system is explained below referring to the overall flowchart (FIG. 3 or FIG. 4).

A characteristic role and function of each module will be explained hereinafter to be understood and coded by a general programmer.

When an operator of a financial VAN company 100 pays for lotteries, a lotto purchase module receives a predetermined number of original lotto numbers from a lottery selling system of a lotto management bank 50 by a conventional electronic commerce implementation means and method, and stores them as data.

The original lotto numbers (hereafter, referred to as "lotto numbers"), corresponding to the payment, received from the lotto management bank 50 are stored in the lotto number database 121 (hereafter, referred to as "lotto number DB") by the lotto purchase module, and original lotto numbers purchased from Monday to Saturday are stored in the lotto number DB according to the draw round.

The lottery number copy module extracts original lotto numbers individually from the lotto number DB 121, copies an original lotto number as many as the predetermined copy multiple or as many as the number of the copy multiple type, and stores the copied lotto number data in the lottery management DB 123.

That is, as illustrated in the following table 1, for example, if the number of the original lotto numbers, purchased and stored as data, is 100,000 (cash 100 million Won), a lottery number copy module copies each lottery number as many as the predetermined copy multiple (N).

TABLE 1

| Copy multiple | N |
| Number of original lotto numbers | 100,000 |
| Number of copy lotto numbers | 100,000 * N |
| Theoretical prize share ratio | 1/N |

In the case where the copy multiple is determined as 20 in the above table, there exists 20 copied lotto numbers, which have the same lotto number as the original lottery. If the above copied lotto number wins and the prize are decided, 20 users receive a portion of the prize at the ratio of 20 to 1 respectively.

On the contrary, as illustrated in the following table 2, the lottery number copy module copies the data of the original lotto numbers corresponding to original lotto numbers, for example 100,000. Each of lotto numbers is copied differently according to the various predetermined copy multiple types.

TABLE 2

| | Copy multiple Types | | | |
| --- | --- | --- | --- | --- |
| | N = 100 | N = 50 | N = 20 | N = 1 |
| Number of original lotto numbers | 50,000 | 30,000 | 15,000 | 5,000 |
| Number of copy lotto numbers | 5,000,000 | 1,500,000 | 300,000 | 5,000 |
| Theoretical prize share ratio | 1/100 | 1/50 | 1/20 | 1/1 |

In the present invention, since all the original lotto numbers are copied differently according to the copy multiple type, the prize allotment ratio varies in accordance with the copy multiple.

According to a contract between a credit or debit card holder 10, a credit or debit card company 30, and a member store 20, the actual prize allotment ratio of one card holder 10 may be divided into the dividend of a card holder 10 who is related with the receipt of lotto to, the dividend of a member store, and social welfare (service) organization funds, in proportion to predetermined percentages.

The customer refund vs. lotto management module calculates the consumer (card holder) compensation money using either a credit rating or a monthly purchase amount of a credit card holder 10, or on the basis of the purchase amount for a month, and categorizes the lotto number of small copy multiple according to the ratio of the calculated amount of money.

When the consumer compensation money calculated by the customer refund vs. lotto management module is relatively small, the customer refund vs. lotto management module arranges a lotto number which has relatively big copy multiple to a predetermined data field.

On the contrary, when the consumer compensation money calculated by the customer refund vs. lotto management module is relatively big, the customer refund vs. lotto management module arranges a lotto number which has relatively small copy multiple to a predetermined data field.

In a method of providing lotto according to the present invention, the probabilities to win of the above arranged lotto numbers are same, however, since the theoretical prize allotment ratio can be changed relatively higher or lower, the invention may provide a proper customer compensation service to a user who pays much by a card.

The lottery number generation module randomly generates a lotto number, a corresponding copy multiple, and a draw round from the same data field as the above assigned lotto number, using a normal random number.

The lottery number generation module can be modified by program not to generate a lotto number in case the consumer compensation money is minus, but to extract a guide message from the lottery management DB.

The lottery number generation module can control so as the same lotto number to be printed or not on a receipt (sales bill) of the same credit or debit card holder at least until a predetermined time, or can generate a same or different number by a random number. These functions can be accomplished by programming to substitute and assign a random number for the value of a program condition, to record the lotto number, issued to a card holder, 10 in the card holder DB 129 of a credit or debit card holder 10 and manage it, and to check the existence of the same lotto number by searching the card holder DB 129, after generating a lotto number.

The data integration module integrates the copy multiple, the draw round, and the lotto numbers copied as many as the copy multiple with the member store approval data.

The settlement management module manages the expenses of lotto purchase, a VAN charge, a data communication charge, and an advertisement charge.

A lotto supply server 110 comprises a lotto number DB 121, a lottery management DB 123, a member store DB 124, an advertisement DB 125, a consumer compensation money DB 126, a settlement DB 127, a transmission result DB 128, and a card holder DB 129.

The lotto supply server 110 more comprises a website and an Internet information server operated by a wired and wireless combined engine, which provides services, such as offering contents, confirming the result of a draw, registering a customer, paying prize, and introducing the lotto which uses a credit or debit card bill and receipt, to a member store 20 and a credit or debit card holder 10 through the ordinary wired and wireless Internet network 131.

The lotto supply server 110 more comprises an SMS/Email server 130, which transfers a character message using a bidirectional character mail service, i.e. normal MO-SMS service, referring to the telephone numbers recorded in the carder holder DB 129, through the ordinary wired and wireless Internet network 131.

Here, the SMS/Email server 130 comprises general programs and communication infrastructure to send an email or a character message. Using these functions, it notifies the winning of prize of lotto, and broadcasts mobile receipt data, which combines the copy multiple, the draw round, and the lotto numbers copied as many as the copy multiple, to the wireless terminals 11 of credit or debit card users 10. The broadcasting technology uses a common wired and wireless communication technology.

Hereafter, a method of issuing a lotto using a bill of a credit or debit card, a receipt, or an advertisement bill is explained in order of circled numbers, referring a network configuration according to the invention.

① A financial VAN company 100 pays the price and sends a purchase data for a few lotto numbers to a lotto management bank 50 through a packet network.

② According to the payment of the financial VAN company 100, the lotto management bank 50 sends a lotto number request data to the lotto management system of the lotto management bank 50.

③ According to the payment of the price, the lotto management bank 50 generates lotto numbers corresponding to the payment, and sends them to the lottery selling system.

④ The lotto management bank 50 prints lotto numbers on a lotto output bill using a normal lotto number output program, and transfers the printed lotto output bill and the lotto numbers to the operator of the financial VAN company 100. The operator of the financial VAN company 100 receives the lotto output bill offline, and the contents of a member store advertisement and lotto numbers are transmitted as an Excel file or a DB file through a leased packet network.

⑤ a credit or debit card holder 10 requests purchase presenting a credit or debit card;

⑥ a CAT sends a transaction request message to the relay system of the financial VAN company 100;

⑦ in order to approve the request, the relay system of the financial VAN company 100 reads the information of the card company from the transaction request message and sends a combination of the information related to the transaction request to the transaction approval system of the credit or debit card company 30;

⑧ the transaction approval system of the credit or debit card company 30 verifies the validity of the transaction, and sends an transaction approval message to the relay system of the financial VAN company 100;

⑨ when the transaction approval data is sent from the transaction approval system of the credit or debit card company 30, the relay system of the financial VAN company 100 stores the transaction approval data in the transaction approval data DB 122. The lottery number generation module of the lotto supply server 110 of the financial VAN company 100 extracts data containing any one of the copy multiple, the draw round, and the copied lotto number from the lottery management, and the data integration module integrates at least one of the copy multiples, the draw round, and the lotto numbers copied as many as the copy multiple with the member store approval data. Thereafter, the relay system of the financial VAN company 100 returns the contents of the member store advertisement 125 and the integrated approval data of the lotto to the CAT of the member store 20, and stores the transmission log in the transmission DB.

⓾ Based on the returned integrated approval data of the lotto, the CAT of the member store 20 prints the lotto number—the result of payment, the copy multiple, the draw round, and the same lotto numbers copied as many as the copy multiple—on the bill and the receipt of a credit or debit card, according to the above integrated approval data of the lotto. Even though the operator of the member store gives the receipt to the user or not, after the draw of the lottery, the result of the draw is notified only to the winners by an email or a character message. Then, the prize is deposited into a settlement bank of the credit or debit card holder 10, or into an account designated by the credit or debit card holder 10, in proportion to the ratio of copy multiple or the prize allotment.

FIG. 3 illustrates the operating sequence of the program executing in a lotto supply server and a relay system of a financial VAN company 100.

A lotto purchase module of a lotto supply server receives predetermined number of original lotto numbers in forms of data from a lottery selling system of a lotto sales agent or a lotto management system of a lotto management bank S10, and stores the received original lotto numbers in the lotto number DB by draw round S11.

The lottery number copy module of a lotto supply server, as described in detail, extracts the original lotto number and copies as many as the predetermined copy multiple S12, stores the copied lotto numbers in the lottery management DB by the draw round and the copy multiple S13, and designs and stores the advertisement ordered by the member store S14.

A relay system of a financial VAN company receives a member store approval request data from a member store, sends the member store approval request data to a corresponding credit card company, then receives a member store approval data from the credit card company and stores the received approval data in the approval data DB S15–S16.

A lottery number generation module of a lotto supply server extracts data containing any one of copy multiples, a draw round, a lotto number from the lottery management DB S17.

As described above, a data integration module of the lotto supply server integrates the copy multiple, the draw round, and the copied lotto numbers with the member store approval data S18.

The relay system of the financial VAN company returns the integrated approval data of the lotto to the CAT of a member store, and stores the transmission log in the transmission DB D19.

In this case, as depicted in FIG. 4, a result of transaction approval, a unique number 203, a code for preventing reproduction 204, a lotto number 201, and a draw round 202 are printed on a sales bill of a financial transaction, such as a receipt 200 of a credit or debit card, corresponding to the above integrated approval data of the lotto.

The receipt 200 of the credit or debit card is given to the credit or debit card holder.

Thereafter, when the result of the lotto draw is publicized through TV, the Internet, or a website, the operator of a financial VAN company presents the original lotto and receives the prize from the lotto management bank; extracts information of the winner, the copy multiple, and the member store where the winner used the card, from one of the lotto number DB, the lottery management DB, and the card holder DB through a database management system; informs the winner and the member store of the winning of the prize; and transfers the prize, in proportion to the prize allotment ratio, to the account of the card holder, or let the card holder receives the prize personally.

According to the invention, issue of a lotto using a bill or a receipt of a credit or debit card, and an advertisement using a receipt of a lotto have an effect of providing a credit or debit card user with a right to draw a lotto as a customer compensation.

According to the invention, since a lotto number is printed whenever a credit or debit card is used for payment, a method of providing lotto using a bill or a receipt of a credit or debit card may induce customers to use cards, thereby increasing sales of member stores.

According to the invention, a method of issuing a lotto using a bill or a receipt of a credit or debit card, and providing an advertisement on a receipt of a lotto can provide a credit or debit card holder with a lotto before a certain amount of points, cashback, or mileage is accumulated, and, even though the amount to pay is small, a lotto number which has the same probability as a general lotto is provided to a credit or debit card holder whenever it is used to pay for the goods, whereby the use of a credit or debit card and cash for small amount purchase is encouraged.

Since a method of issuing a lotto using a bill or a receipt of a credit or debit card, and providing an advertisement on a receipt of a lotto is realized in real-time by a lotto to supply server of a financial VAN company, a system can be easily constructed using an existing credit or debit card infrastructure as it is, and, while the cost for constructing additional systems is minimized, financial VAN companies and card companies to which the invention is applied can provide a customer compensation service and possess competitive powers.

In addition, a method of issuing a lotto using a bill or a receipt of a credit or debit card, and providing an advertisement using a receipt of a lotto can provide lotto, not shifting by force the burden of lotto funds on credit or debit card companies, financial VAN companies, member stores, and customers, and is beneficial to member stores, lotto companies, and financial VAN companies by providing an advertisement medium. Moreover, a portion of the prize is appropriated for member store growth and a social welfare (service) organization funds, whereby the method may take a role in constructing a credit society and a sound economy.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. That is, it should be understood that printing a predetermined copy multiple of lotto numbers on receipts of GIRO and cash dispenser, and sales bill of financial business, etc., falls within the scope of the appended claims.

What is claimed is:

1. A method of providing lotto using a bill or a receipt of a credit or debit card, in which a common authentication technology (CAT) sends a transaction request message prepared from a combination of user information, purchase information, and member store information to a relay system of a financial value added network (VAN) company; the relay system of the financial VAN company sends the transaction request message to a transaction approval system of a corresponding financial company; and the transaction approval system of the financial company compares the transaction request message with data of the financial company, verifies the validity of the transaction, and sends a transaction approval message to the relay system of the financial VAN company, the method comprising steps of:

a) allowing the relay system of the financial VAN company to store a transaction approval data in a transaction approval data database (DB);
b) allowing a lottery number generation module of a lotto supply server of the financial VAN company to extract a copy multiple, a draw round, and copied lotto numbers from a lottery management DB;
c) allowing a data integration module of the lotto supply server to integrate the copy multiple, the draw round, and the copied lotto numbers with the member store approval data;
d) allowing the relay system of the financial VAN company to return an integrated approval data of the lotto to the CAT of the member store; and
e) allowing by the CAT to output the returned lotto integrated approval data on the bill or the receipt of the credit or debit card.

2. The method according to claim 1, wherein a lottery number copy module of the lotto supply server extracts original lotto numbers individually from a lotto number DB, thereafter copies an original lotto number as many as a predetermined copy multiple so as to have a same number or as many as the number of a copy multiple type, and stores the copied lotto number data in a lottery management DB.

3. A lotto supply server connected with at least one CAT, at least one transaction approval system of a financial company, and a lottery selling system through a network, wherein the lotto supply server comprises a processor connected with a memory in which a program is stored for executing the program, the processor, by means of the program, receiving predetermined number of original lotto numbers in the form of data from a lottery selling system to store the received original lotto numbers in a lotto number DB according to its draw round, copying the original lotto numbers extracted from the lotto number DB as many as the predetermined copy multiple to store the copied original lotto numbers in the lottery management DB, and integrating at least one of copy multiples, a draw round, and copied lotto numbers extracted from a lottery management DB with a member store approval data to create an integrated approval data of the lotto, and wherein a relay system of the financial VAN company sends the integrated approval data of the lotto to a corresponding CAT of a member store.

4. The lotto supply server according to claim 3, further comprising a lotto purchase module, a lotto copy module, a customer refund vs. lotto management module, a lottery number generation module, a data integration module, and a settlement management module; and further comprising a lotto number DB including at least one original lotto number data, a lottery management DB including at least one copied lotto number data, a member store DB, a consumer compensation money DB, a settlement DB, a transmission result DB, and a card holder DB, which are arranged, modified, extracted, recorded, and stored by a database management system 120.

* * * * *